United States Patent [19]
Kohama et al.

[11] 4,384,484
[45] May 24, 1983

[54] GAS FLOW MEASURING DEVICE

[75] Inventors: Tokio Kohama, Nishio; Hideki Obayashi, Okazaki; Hisasi Kawai, Toyohashi; Tsuneyuki Egami, Aichi, all of Japan

[73] Assignee: Nippon Soken, Inc., Nishio, Japan

[21] Appl. No.: 242,825

[22] Filed: Mar. 12, 1981

[30] Foreign Application Priority Data

Apr. 9, 1980 [JP] Japan ................................. 55-46478

[51] Int. Cl.³ .............................................. G01F 1/68
[52] U.S. Cl. ......................................... 73/204; 73/118
[58] Field of Search ............................... 73/204, 118

[56] References Cited

U.S. PATENT DOCUMENTS 1,902,427 3/1933 Sawyer ................................ 73/204
2,729,976 1/1956 Laub .................................... 73/204
3,975,951 8/1976 Kohama et al. .................... 73/204
4,244,217 1/1981 Ledbetter ........................... 73/204

Primary Examiner—Herbert Goldstein
Attorney, Agent, or Firm—Cushman, Darby & Cushman

[57] ABSTRACT

A first temperature dependent resistor and a second temperature dependent resistor are disposed within a pipe for flowing a gas whose flow rate is to be measured. An electric heater is located between these temperature dependent resistors and is heated for the purpose of measurement of the flow rate of the gas. A first reference resistor and a second reference resistor constitute a bridge circuit together with the first and second temperature dependent resistors. A measuring circuit controls the current or voltage applied to the electric heater in accordance with the voltage between the terminals of the bridge circuit, so as to generate an output signal representing the flow rate of the gas. The temperature coefficient resistance of the electric heater is smaller than that of the temperature dependent resistors.

2 Claims, 6 Drawing Figures

GAS FLOW MEASURING DEVICE

BACKGROUND OF THE INVENTION

This invention is related to co-pending U.S. application Ser. No. 92,024 filed on Nov. 7, 1979 and now U.S. Pat. No. 4,332,164 and assigned to the same assignee.

This invention relates to a gas flow measuring device, or more in particular to a device for measuring the flow rate of an engine intake air.

In conventional devices, an electric heater is provided on the intake manifold of the engine, and temperature-dependent resistors are arranged before and after the heater, thereby to detect the flow rate of the intake air (the gas to be measured).

Such conventional devices have the advantage of a small and simple construction for measuring the flow rate by weight of the intake air. In view of the fact that the electric heater and the temperature dependent resistors are made of resistance wires of the same temperature coefficient, however, the effect of the heat of the intake air cannot be compensated for.

An electric wiring diagram for explaining the principle of a prior art gas flow rate measuring device is shown in FIG. 1. In the construction shown in FIG. 1, reference numeral 10 shows an electric heater having a resistance value of $R_H$ ($\Omega$), numeral 11 a first temperature dependent resistor having a resistance value of $R_1$ ($\Omega$), numeral 12 a second temperature dependent resistor having a resistance value of $R_2$ ($\Omega$), and numerals 21 and 22 are reference resistors of the resistance values of $R_3$ and $R_4$ ($\Omega$) respectively making up a bridge circuit together with the first and second temperature dependent resistors 11 and 12. Both the electric heater 10 and the temperature dependent resistors 11 and 12 are formed of a resistor wire having the same temperature coefficient of $\alpha$. When the intake air of $Ta°C$. is heated by the electric heater 10 and the temperature thereof increases by $\Delta T°C$., the temperatures of the first and second temperature dependent resistors 11 and 12 increase to $Ta + \Delta T$ and $Ta$ respectively, so that the resistors $R_H$, $R_1$ and $R_2$ are expressed as shown below respectively.

$$R_H = R_{OH}(1 + \alpha \cdot Ta + \alpha \cdot \Delta T_H) \quad (1)$$

$$R_1 = R_{01}(1 + \alpha \cdot Ta + \alpha \cdot \Delta T) \quad (2)$$

$$R_2 = R_{02}(1 + \alpha \cdot Ta) \quad (3)$$

where $R_{OH}$, $R_{01}$ and $R_{02}$ are the values of the resistors $R_H$, $R_1$ and $R_2$ respectively at the temperature of 0° C., and $\Delta T_H$ is a temperature increase of the electric heater due to the intake air temperature $Ta$. Assuming that the electric potentials at the diagonal points a and b of the bridge circuit are $V_1$ and $V_2$ respectively, the bridge output voltage $\Delta V = V_1 - V_2$ is given as shown below.

$$\Delta V = V \cdot \left( \frac{R_4}{R_3 + R_4} - \frac{R_2}{R_1 + R_2} \right) \quad (4)$$

where V is the voltage applied to the bridge and the electric heater.

From equations (2) to (4), if $R_3 = R_4$ and $R_{01} = R_{02}$, the temperature difference $\Delta T$ is expressed as $$\Delta T = \frac{4(1 + \alpha \cdot Ta) \cdot \Delta V}{\alpha(V - 2 \cdot \Delta V)} \quad (5)$$

If the heat conduction to other than the air from the electric heater is ignored, on the other hand, the relation between the intake air amoung G (g/sec), the temperature difference $\Delta T$ and the applied voltage V is given by the equation below.

$$G \cdot Cp \cdot \Delta T = K_1 \cdot I^2 \cdot R_H \quad (6)$$

where Cp is a constant pressure specific heat of the air, $K_1$ a constant and I the current flowing in the electric heater. By erasing $\Delta T$ from the equations (5) and (6), the equation below is obtained.

$$G = K_2 \cdot \frac{V - 2 \cdot \Delta V}{(1 + \alpha \cdot Ta) \cdot \Delta V} \cdot I^2 \cdot R_H \quad (7)$$

In the operation of this device, $\Delta V << V$ and the value $\Delta V$ controlled at a fixed value, and therefore the equation (7) is rewritten as below.

$$G = K_3 \cdot \frac{R_H^2}{(1 + \alpha \cdot Ta)} \cdot I^3 \quad (8)$$

where $K_3$ is a constant. Alternatively, it is given as below.

$$G = K'_3 \cdot \frac{1}{(1 + \alpha \cdot Ta) \cdot R_H} \cdot V^3 \quad (9)$$

where $K_3'$ is a constant.

The amount of the intake air is a function of the cube of the current flowing in the electric heater 10 or a function of the cube of the voltage applied to the electric heater 10. The coefficient concerned has a term of the intake air temperature $Ta$, and for the purpose of accurate measurement of the amount of intake air, the problem is a measuring error resulting from the fact that the term of the intake air temperature is not completely eliminated.

SUMMARY OF THE INVENTION

The present invention has been developed in view of the above-mentioned problems, and an object thereof is to provide a gas flow rate measuring device of high accuracy in which the effect of the temperature of the gas to be measured is substantially eliminated.

DESCRIPTION OF THE PREFERRED EMBODIMENTS

Figure 1:
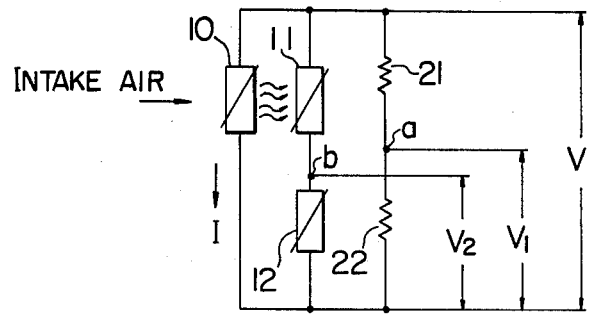
FIG. 1 is a diagram for explaining the operating principle of a conventional gas flow rate measuring device as described above.
Figure 2:
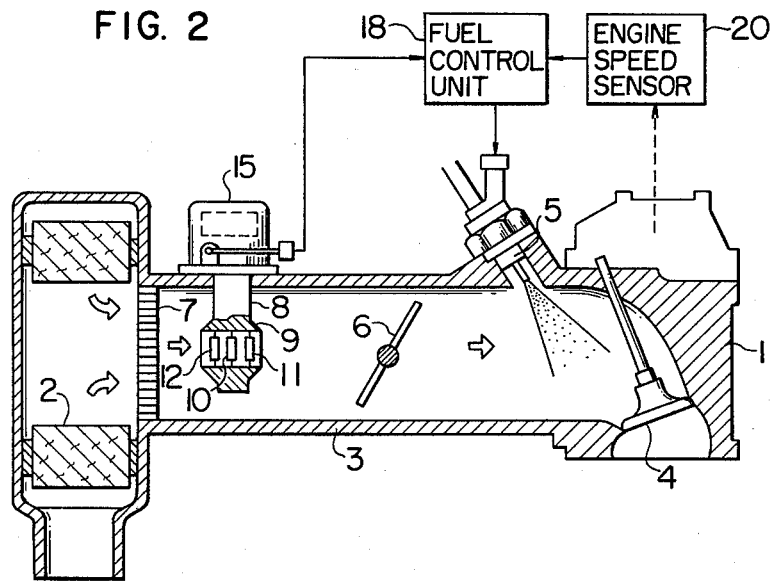
FIG. 2 is a diagram showing a general configuration of an embodiment of the present invention.

In FIG. 2 showing an embodiment of the present invention, an engine 1 is of spark ignition type for driving an automobile and takes air thereinto for combustion through an air cleaner 2, an intake manifold 3 and an intake valve 4.

The intake manifold 3 has a throttle valve 6 operated by a driver as desired. A rectifier grid 7 is provided for rectifying the air flow at the connection between the intake manifold 3 and the air cleaner 2.

Between the rectifier grid 7 and the throttle valve 6 in the intake manifold 3, a small flow rate measuring tube 9 is provided by a support 8 substantially in parallel to the axis of the intake manifold 3. Within this flow rate measuring tube 9, there is an electric heater 10 including a resistance wire of platinum rhodium as illustratively shown. A first temperature-dependent resistor 11 of a platinum resistance wire is provided at a position approximate to the electric heater 10 downstream thereof. Further a second temperature-dependent resistor 12 of a platinum resistance wire is provided at a position somewhat distant from the electric heater upstream thereof.

Figure 3:
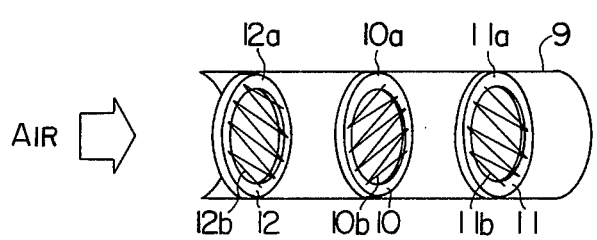
FIGS. 3 and 4 are a perspective view and a front view respectively showing an arrangement of the electric heater and the first and second temperature dependent resistors of FIG. 2.
Figure 4:
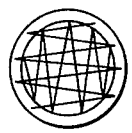

The electric heater 10, and the first and second temperature-dependent resistors 11 and 12 are so constructed that as shown in FIG. 3 the platinum rhodium wire 10b and the platinum resistance wires 11b and 12b are arranged in grid form on the annular printed boards 10a, 11a and 12a respectively. In particular, the first and second temperature dependent resistors 11 and 12 have a platinum resistance wire of the same resistance temperature characteristics. The electric heater 10 and the first temperature-dependent resistor 11 are arranged in such relative positions that when they are viewed from the front or back side, the resistance wires thereof intersect each other as shown in FIG. 4. This prevents a very small heat distribution within the flow rate measuring tube 9 from having an effect on the first temperature-dependent resistor 11.

The electric heater 10 and the first and second temperature-dependent resistors 11 and 12 are all connected to the measuring circuit 15. By use of the output signals of the electric heater 10, and the first and second temperature-dependent resistors 11 and 12, the measuring circuit 15 measures the flow rate of the intake air making up an object gas to be measured, and produces an electric output signal representing the flow rate thus measured.

Figure 5:
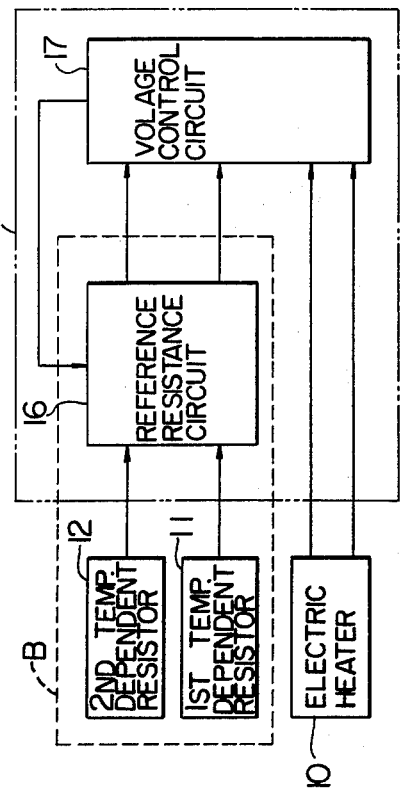
FIG. 5 is a block diagram showing a measuring circuit shown in FIG. 2.

As seen from FIG. 5, the measuring circuit 15 comprises a reference resistor circuit 16 and a voltage control circuit 17. The reference resistor circuit 16, together with the first and second temperature dependent resistors 11 and 12, make up a bridge circuit B. In accordance with the voltages at the diagonal points a and b of the bridge B, the voltage control circuit 17, on the other hand, regulates the voltage applied to the other diagonal points of the bridge B and the electric heater 10.

A fuel control unit 18 is for controlling the valve-open time of the electromagnetic fuel injection valve 5 in response to a signal produced from the measuring circuit 15. The fuel control unit 18 is also supplied with a detection signal from such a device as a rotational speed sensor 20 for detecting the rotational speed of the engine 1. This rotational speed sensor 20 comprises, for instance, an ignition circuit for generating an ignition pulse signal.

Figure 6:
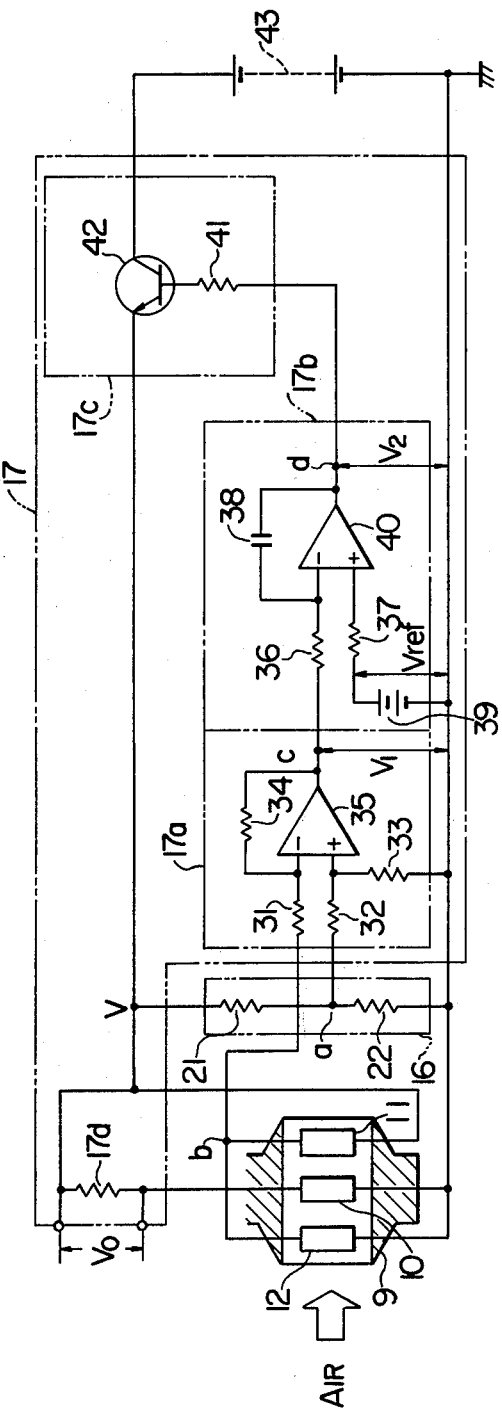
FIG. 6 is an electric circuit diagram showing the measuring circuit of FIG. 5.

With reference to FIG. 6, the circuits 16 and 17 of the measuring circuit 15 will be described. The reference resistor circuit 16 is comprised of reference resistors 21 and 22 connected with each other and making up the bridge B with the first and second temperature-dependent resistors 11 and 12.

The voltage control circuit 17 includes a first differential amplifier circuit 17a, a second differential amplifier circuit 17b, a power amplifier circuit 17c and an output resistor 17d. Among these component elements, the first differential amplifier circuit 17a includes input resistors 31, 32, a grounding resistor 33, a negative feedback resistor 34 and an operational amplifier 35 for producing the voltages at diagonal points a and b of the bridge B at the terminal c after differential amplification.

The second differential amplifier circuit 17b includes input resistors 36, 37, a capacitor 38, a reference voltage source 39 and an operational amplifier 40 for producing at the terminal d the output voltage of the terminal c and the constant reference voltage Vref of the reference voltage source 39. A capacitor 38 is provided for the purpose of preventing the oscillation of the device of the invention.

The power amplifier circuit 17c includes a resistor 41 and a power transistor 42. The power transistor 42 is supplied with power from the battery 43 for power-amplifying the output voltage of the second amplifier circuit 17b and applying the resulting output to the bridge B and the electric heater 10.

The output resistor 17d is for producing a voltage associated with the flow rate of the intake air and is connected in series with the electric heater 10.

The operation of the circuits thus configured will be described. A certain amount of air determined by the degree of opening of the throttle valve 6 is taken into the engine 1 through the intake manifold 3 from the air cleaner 2. A predetermined proportion of the total intake air passes through the flow rate measuring tube 9 and then is taken into the engine 1.

In the flow rate measuring tube 9, the second temperature-dependent resistor 12 upstream of the electric heater 10 is affected only by the temperature of the intake air. The first temperature-dependent resistor 11 positioned downstream of the electric heater 10, on the other hand, is affected by the temperature of the intake air and the amount of heat generated by the electric heater 10, that is, by the temperature of the air heated by the electric heater 10.

As a result, a temperature difference $\Delta T$ related to the amount of power P (W) supplied to the electric heater 10 and the flow rate of the intake air G (g/sec) occurs between the temperature dependent resistors 11 and 12. The values P, G and $\Delta T$ have the relation mentioned below.

$$K_4 \cdot \Delta T = P/G \tag{10}$$

where $K_4$ is a constant. The electric resistance value of the temperature-dependent resistors 11 and 12 changes with the temperature of air, and therefore a potential difference $\Delta V$ determined by the temperature difference $\Delta T$ and the voltage V applied to the bridge B occurs between the points a and b of the bridge B as seen from the equation (11) below.

$$\Delta V = \frac{\alpha}{4(1+\alpha \cdot Ta)} \cdot \Delta T \cdot V \quad (11)$$

where Ta is the temperature of the intake air, and α the resistance temperature coefficient of platinum.

From equations (10) and (11), the equation below is obtained.

$$K_5 \cdot (1+\alpha \cdot Ta) \cdot \Delta V/V = P/G \quad (12)$$

where $K_5$ is a constant. Thus, if the value ΔV is maintained constant by controlling the power P supplied to the electric heater 10 and the voltage V applied to the bridge B, the relation between the flow rate of the intake air G, the supplied power P and the bridge applied voltage V is as shown by the equation below.

$$G = K_6 \cdot P \cdot V \quad (13)$$

where $K_6$ is a constant. In the case where the value of the output resistor 17d is rendered smaller as compared with that of the electric heater 10, $$P = R_{OH} \cdot (1+\alpha_H \cdot T_H) \cdot I^2 \quad (14)$$

$$V = R_{OH} \cdot (1+\alpha_H \cdot T_H) \cdot I \quad (15)$$

where $\alpha_H$ is the resistance temperature coefficient of the electric heater 10, I is the current flowing in the electric heater 10 and $T_H$ the average temperature of the electric heater 10. From these equations (14) and (15), the equation (12) is rewritten as follows:

$$G = K_7 \cdot \frac{(1+\alpha_H \cdot T_H)^2}{(1+\alpha \cdot Ta)} \cdot I^3 \quad (16)$$

($K_7$: constant)

$$G = K_7 \cdot \frac{1}{(1+\alpha \cdot Ta)(1+\alpha_H \cdot T_H)} \cdot V^3 \quad (17)$$

The flow rate G of the intake air is a function of the cube of the current I or the voltage V. The equations (16) and (17) are both affected by the temperature of the intake air for the reason that the coefficient thereof includes the intake air temperature Ta. On the assumption that the entire heat of the electric heater 10 is transmitted to the air, however, the heater temperature $T_H = Ta$, and therefore the equation (16) is given as $$G \approx K_8 \cdot \frac{(1+2\alpha_H \cdot Ta)}{(1+\alpha \cdot Ta)} \cdot I^3 \quad (18)$$

Thus, assuming that $\alpha_H$ is selected to be $\frac{1}{2} \cdot \alpha$, the intake air temperature Ta can be cancelled from the equation (17), as given by the following equation (19).

$$G \approx K_8 \cdot I^3 \quad (19)$$

In the foregoing description, the resistance temperature coefficient $\alpha_H$ of the electric heater 10 is assumed to be one half of the resistance temperature coefficient α of the first and second temperature dependent resistors 11 and 12 so that the term of the intake air temperature Ta may be eliminated from the equation representing the flow rate G of the intake air. Experiments show, however, that if the value $\alpha_H$ is (not extremely) smaller than the value α, the effect of the intake air temperature on the flow rate G can be kept ignorably small.

The voltage control circuit 17 controls the value ΔV at a constant level by controlling the amount of heat generated by the electric heater 10. In other words, with the increase in the flow rate of the intake air, the degree of increase of the temperature of the air heated by the electric heater 10 decreases, with the result that the temperature difference ΔT between the first and second temperature dependent resistors 11 and 12 also decreases and so does the potential difference ΔV between the points a and b of the bridge.

Thus the output voltage $V_1$ of the first differential amplifier circuit 17a is reduced, while the output voltage $V_2$ of the second differential amplifier 17b depending on the value (Vref−$V_1$) is increased. As a result, the power amplifier circuit 17c increases the current supply to the electric heater 10, thus increasing the amount of heat generated by the electric heater 10.

The temperature difference ΔT between the first and second temperature dependent resistors 11 and 12 increases and so does the potential difference ΔV between the point a and b of the bridge. Accordingly, with the potential difference ΔV equal to the reference voltage Vref, the whole system is balanced while the bridge is unbalanced in stable conditions.

With the decrease in the flow rate of the intake air, on the other hand, the degree of increase of the temperature of the air heated by the electric heater 10 increases, so that the temperature difference ΔT between the first and second temperature dependent resistors 11 and 12 increases, thus increasing the potential ΔV.

The output voltage $V_1$ of the first differential amplifier circuit 17a increases while the output voltage $V_2$ of the second differential amplifier circuit 17b decreases. As a result, the current supply to the electric heater 10 is reduced by the power amplifier circuit 17c, thus reducing the amount of heat generated by the electric heater 10.

The temperature difference ΔT decreases and so does the potential difference ΔV, with the result that both the system and the bridge reaches a balanced state with the potential difference ΔV equal to the reference voltage Vref.

In this way, the potential difference ΔV between the points a and b of the bridge is held at the constant value Vref regardless of the flow rate of the intake air, and the equation (19) is established. Thus the flow rate G of the intake air is expressed as a function of the cube of the current I flowing in the electric heater 10 without being affected by the intake air temperature Ta.

This current I also flows through the output resistors 17d, and therefore is proportional to the terminal voltage Vo of the output resistor 17d, so that the cube of the voltage Vo is proportional to the flow rate G of the intake air.

The voltage Vo is applied to the fuel control unit 18 as a signal representing the flow rate G of the intake air, and the fuel control unit 18 produces an injection pulse signal for opening the fuel injection valve in response to the voltage signal Vo and the ouput signal of the rotational speed sensor 20. The air and fuel of a correct air-fuel ratio A/F is supplied to the engine 1, thus improving the exhaust gas purification characteristic, output and fuel efficiency of the engine 1.

The embodiments described above have a configuration in which the electric heater 10, and the first and second temperature dependent resistors 11 and 12 are comprised of resistance wires, which may be replaced with equal effect by a film resistor or other equivalent resistors in the case where the resistance temperature coefficient thereof is utilized. Further, the embodiments mentioned above are applied to a fuel injection type engine, but the device according to the present invention may be applied with equal effect to a carburetor type engine or an engine in which the amount of the exhaust gas recirculation or the ignition timing advance are controlled by the amount of the intake air.

In addition, this invention finds applications in the case where the flow rate of a gas is measured in a combustion system other than the engine.

Furthermore, this invention can be used for measurement of the flow rate of a gas in the field of industrial instrumentation other than an engine.

Also, the measuring circuit 15 may include an analog linear circuit or a read only memory (ROM) in a manner to produce an output signal in linear relation to the flow rate of the intake air.

We claim:

1. A gas flow measuring device comprising:
   pipe means for flowing a gas whose flow rate is to be measured;
   an electric heater disposed within said pipe means;
   a first temperature-dependent resistor having a temperature coefficient, disposed within said pipe means downstream of said electric heater;
   a second temperature-dependent resistor having a temperature coefficient disposed, within said pipe means, at a position suffering substantially no influence of heat from said electric heater, a temperature coefficient of resistance of said electric heater is substantially one half of said first and second temperature-dependent resistors;
   first and second reference resistors connected to form a bridge circuit; and
   a measuring circuit connected to said bridge circuit and said electric heater, for controlling electric power applied to said electric heater in accordance with an output indicative of the flow rate of said gas.

2. A gas flow measuring device according to claim 1, wherein said electric heater includes a resistance wire of platinum rhodium, while each of said first and second temperature-dependent resistors includes a resistance wire of platinum.

* * * * *